US006739723B1

(12) United States Patent
Haven et al.

(10) Patent No.: US 6,739,723 B1
(45) Date of Patent: May 25, 2004

(54) POLARIZATION RECAPTURE SYSTEM FOR LIQUID CRYSTAL-BASED DATA PROJECTORS

(75) Inventors: Thomas J. Haven, Portland, OR (US); Kurt R. Munson, Tigard, OR (US)

(73) Assignee: Delta Electronics, Inc., Taipei (TW)

( * ) Notice: Subject to any disclaimer, the term of this patent is extended or adjusted under 35 U.S.C. 154(b) by 201 days.

(21) Appl. No.: 10/014,029

(22) Filed: Dec. 7, 2001

(51) Int. Cl.[7] .................. G03B 21/00; G03B 21/14; G03B 21/20; G02F 1/1335; H04N 3/14

(52) U.S. Cl. .................. 353/20; 353/31; 353/33; 353/84; 353/102; 349/9; 348/790

(58) Field of Search .................. 353/20, 33, 34, 353/37, 84, 121, 31, 97, 98, 102; 349/5, 7, 8, 9; 348/744, 758, 761, 790

(56) References Cited

U.S. PATENT DOCUMENTS

| | | | |
|---|---|---|---|
| 5,283,600 A | 2/1994 | Imai | 353/34 |
| 5,410,370 A | 4/1995 | Janssen | 348/756 |
| 5,532,763 A | 7/1996 | Janssen et al. | 348/744 |
| 5,548,347 A | 8/1996 | Melnik et al. | 348/761 |
| 5,751,388 A | 5/1998 | Larson | 349/96 |
| 5,812,223 A | 9/1998 | Noguchi | 349/9 |
| 5,845,981 A | 12/1998 | Bradley | 353/31 |
| 5,868,481 A | 2/1999 | Conner et al. | 353/38 |
| 5,986,730 A | 11/1999 | Hansen et al. | 349/96 |
| 5,995,284 A | 11/1999 | Vanderwerf | 359/487 |
| 6,108,131 A | 8/2000 | Hansen et al. | 359/486 |
| 6,122,103 A | 9/2000 | Perkins et al. | 359/486 |
| 6,191,893 B1 | 2/2001 | Bradley | 359/634 |
| 6,208,463 B1 | 3/2001 | Hansen et al. | 359/486 |
| 6,273,567 B1 | 8/2001 | Conner et al. | 353/20 |

OTHER PUBLICATIONS

Patent Publication No. US 2001/0008470 A1, Pub. Date Jul. 19, 2001, Dewald (10 pages).
Markus Duelli, Tony McGettigan, and Clark Pentico, (published 2002), "Integrator Rod with Polarization Recycling Functionality", SID 02 DIGEST, pp. 1078–1080.
Arnold, Stephen et al., "An Improved Polarizing Beamsplitter LCOS Projection Display Based on Wire–Grid Polarizers," SID 01 Digest, 1282–1285 (2001).
Dewald, Scott A. et al., "Sequential Color Recapture and Dynamic Filtering: A Method of Scrolling Color," SID 01 Digest, 1076–1079 (2001).
Kahn, Frederic J., *Focus: Doing it with stripes*, Private Line Report on Projection Display, 7:10, 1–14 (2001).
Pentico, Clark et al., "New, High Performance, Durable Polarizers for Projection Displays," SID 01 Digest, 1287–1289 (2001).

*Primary Examiner*—Russell Adams
*Assistant Examiner*—Melissa J Koval
(74) *Attorney, Agent, or Firm*—Patent Law Group LLP; Carmen C. Cook

(57) ABSTRACT

A projection display system includes a light source emitting a randomly polarized light and a polarization recapture system including a tunnel integrator and a transmitting/reflecting polarizer coupled to the output end of the tunnel integrator. The input end of the tunnel integrator includes an input aperture and a reflective inside surface coated with a quarter wave retarder. In operation, the randomly polarized light enters the tunnel integrator through the input aperture. The polarization recapture system transmits light having a first polarization as polarized light output and recycles light having a second polarization orthogonal to the first polarization. The light having the second polarization is reflected by the transmitting/reflecting polarizer back into the tunnel integrator. The polarization recapture system recycles the light having the second polarization by reflecting and reorienting the light having the second polarization to light of the first polarization.

39 Claims, 5 Drawing Sheets

POLARIZATION RECAPTURE SYSTEM FOR LIQUID CRYSTAL-BASED DATA PROJECTORS

BACKGROUND OF THE INVENTION

1. Field Of The Invention

The invention relates to data projection systems, and more particularly to providing an efficient and uniform source of polarized light in liquid crystal-based projectors.

2. Description of the Related Art

Data projectors, also known as digital projectors, are used for projecting images, usually color images, onto a screen. These projectors generally employ one of two types of data projection technologies. First, there are projectors using liquid crystal display (LCD) panels that act as the image forming device. LCD panels can be grouped into two categories: transmissive panels or reflective panels. Transmissive panels are constructed with front and back glass substrates so that light can travel through the panel. Reflective LCD panels are constructed with a front glass substrate and a reflective silicon back substrate. Projectors using transmissive LCD panels are generally referred to as LCD projectors. Projectors using reflective LCD panels are sometimes referred to as LCOS projectors. (LCOS stands for Liquid Crystal on Silicon). Second, there are projectors using reflective digital light processing (DLP) chips. These silicon based chips have movable micro-mirrors constructed on them that act as the image forming device. These projectors are generally referred to as DLP projectors.

Transmissive and reflective liquid crystal display (LCD) projectors typically include a light source emitting a randomly polarized white light. The light is transmitted through an LCD panel which modulates the light according to the desired image data. The resultant light is projected onto a screen for display. For color applications, a single panel or a three-panel LCD projector can be used. In a three-panel LCD projector, incident white light is typically separated into three primary color light components (such as red, green and blue) using prisms or color dichroic mirrors. Each color component passes through an associated LCD panel and is thus separately modulated. The modulated color components are recombined using a color combination prism and projected to produce a color image. In a single panel LCD projector, a color LCD panel can be used. Alternately, conventional methods for modulating different color light components onto the LCD panel, such as by using a color wheel, can be used.

FIG. 1 is a schematic diagram of a conventional single panel LCD projector. LCD projector 10 includes a parabolic lamp 12 as the light source emitting randomly polarized white light. A bank of lens arrays 14 collects the white light generated by lamp 12 and directs the light onto a polarizing converting system (PCS) plate 16. PCS plate 16 includes a column of polarizing beam splitter (PBS) elements for converting randomly polarized light from lamp 12 to a single polarization. In operation, the incident white light is split into s-polarized light and p-polarized light at the 45° reflecting surface of the polarizing beam splitter element. The p-polarized light is transmitted and s-polarized light is reflected at this surface. The p-polarized light is then transmitted through a half-wave retarder which converts the p-polarized light to s-polarized light. This first beam, now s-polarized, exits PCS plate 16. Meanwhile, the original s-polarized light, separated from the p-polarized light, is reflected a second time in the PCS elements and exits PCS plate 16 as s-polarized light at a distance W from the first beam of s-polarized light. In this manner, PCS plate 16 converts the incoming white light into s-polarized light which is directed to a condenser lens 18. PCS plate 16 using PBS elements can achieve polarization at about 80% efficiency.

Condenser lens 18 focuses the s-polarized light onto a transmissive LCD panel 20. LCD panel 20 typically includes an input polarizer, a liquid crystal module, electrodes for applying charges to the liquid crystal material, and an output polarizer (also called an analyzer). For example, LCD panel 20 can be a conventional thin-film transistor (TFT) active matrix LCD panel. Conventional liquid crystal panels use a twisted-nematic liquid crystal orientation. LCD panel 20 modulates the polarized light incident upon it to form an image to be displayed. The modulated light is directed to a projection lens 22 for magnifying and focusing the image onto a screen (not shown).

LCD panel 20 typically includes an input polarizer to further polarize the incident light to achieve a higher degree of polarization. The input polarizer is needed because PCS plate 16 is only capable of polarizing about 80% of the light. Also, some depolarizatoin can occur as light propagates through other optical elements, such as the condenser lens. Therefore, an input polarizer is placed directly before LCD panel 20 to removes light that is not polarized in the desired orientation. In this manner, the input polarizer ensures that the light transmitted through LCD panel 20 is completely and precisely polarized.

While the conventional LCD projectors such as LCD projector 10 is useful in data projection applications, the conventional LCD projector architecture has several disadvantages. First, the lens array used to collect the light from the light source has a narrow acceptance angle, typically less than ±3 degrees. The narrow acceptance angle of the lens array limits light collection, thus introducing inefficiency in the optical system.

Another disadvantage associated with the conventional LCD projector architecture is the color gradient problem that can occur with the use of the lens array/PCS system in a three-panel LCD projector. FIG. 1 illustrates a single-panel LCD projector. A three-panel LCD projector can be built using any conventional architecture. In one example, one lens array/PCS systems is used and two color separation plates are included in the optical path between the PCS system and the three LCD panels. The color separation plates typically include a color dichroic film for separating the white light from the light source into three separate color components. Most color separation plates are designed to work with light impinging upon it at a 45 degree angle. However, when the lens array system is used, the light transmitted through lenslets on one side (e.g. the left edge) of the lens array go through the color separation plate at different angles than light transmitted through lenslets on the center or right side of the lens array. As a result, the projected image may suffer from a color gradient problem. Attempts at eliminating these color gradients are not satisfactory because they usually involve using "cleanup" filters which cause the loss of final system brightness.

Finally, LCD projectors are typically larger in size than corresponding DLP projectors because they use lens array systems. This is because the lens array, the PCS system and the condenser lens are larger components than the light integrating devices typically used in DLP projectors. The smallest DLP projectors are typically 2–5 lbs. as compared to typical LCD projectors which are 5–8 lbs. LCD projectors are thus not well suited for portable applications. Therefore, it is desirable to provide an LCD projector that is more compact but with improved brightness to improve the portability of the equipment, while avoiding the aforementioned disadvantages.

FIG. 1 illustrates an LCD projector using a transmissive LCD panel. LCD projectors using a reflective LCD panel, such as liquid crystal over silicon (LCOS) panels, are all well known. Reflective LCOS projectors operate by shinning light onto an image forming reflective chip. The light reflected off the image forming reflective chip forms the image to be projected and displayed. In the case of an LCOS projector, the image forming device is a silicon chip with a liquid crystal panel built over the surface of the silicon chip. The liquid crystal cell on the LCOS chip modulates the incident light on a pixel by pixel basis to generate the desired image.

DLP projectors are also well known in the art. In a DLP projector, the image forming reflective chip is a Digital Micromirror Device (DMD) having constructed thereon approximately half to three-quarters of a million of microelectromechanical mirrors. The mirrors can tilt to reflect a predetermined amount of light to form the desired image. To generate color images, the light from the light source is beamed through a rotating color wheel. Separate red, green and blue fields of information are generated sequentially in time. The speed of rotation is fast enough (such as 60 times per second for each color) that the human eye perceives a full color image.

Conventional DLP projectors usually include some sort of light integration mechanism in the optical path to homogenize the light from the light source. This is usually done to enhance the uniformity of the light that illuminates the reflective chip. The light integration mechanism of choice typically is a light tunnel or a tunnel integrator. Because the light integration component is generally small, DLP projectors are smaller than LCD projectors. In addition, because the light coming from a tunnel integrator does not need to be polarized for the DLP chip to function, the smaller DLP projectors can be brighter than similarly constructed LCD projector.

Recently, a sequential color recapture (SCR) technique has been introduced in a DLP projector which uses a tunnel integrator with a mirrored input end and a color wheel with RGB (red-green-blue) dichroic coating at the output end. The SCR technique is described in an article entitled "Sequential Color Recapture and Dynamic Filtering: A Method of Scrolling Color," by D. Scott DeWald, Steven M. Penn, and Michael Davis, SID 01 Digest, p.1076–1079, 2001. The SCR technique improves light efficiency by recycling unwanted primary color light reflected from the color wheel in the tunnel integrator and recaptured by the mirror on the input end of the tunnel. In the paper, a gain of 80% over the conventional color sequential method is reported.

It is desirable to provide an LCD projector that can achieve the brightness level and image uniformity characteristics matching that of a DLP projector. It is also desirable to provide such an LCD projector which is compact and suitable for portable applications.

SUMMARY OF THE INVENTION

According to one aspect of the present invention, a projection display system includes a light source emitting a randomly polarized light and a polarization recapture system. The polarization recapture system includes a tunnel integrator and a transmitting/reflecting polarizer. The tunnel integrator has an input end and an output end where the input end includes an input aperture and a reflective inside surface coated with a quarter wave retarder. The transmitting/reflecting polarizer is coupled to the output end of the tunnel integrator. In operation, the randomly polarized light from the light source arrives at the input end of the tunnel integrator and enters the tunnel integrator through the input aperture. The polarization recapture system transmits light having a first polarization as polarized light output and recycles light having a second polarization orthogonal to the first polarization. In one embodiment, the transmitting/reflecting polarizer is a wire grid polarizer.

Specifically, the light having the second polarization is reflected by the transmitting/reflecting polarizer back into the tunnel integrator. The polarization recapture system recycles the light having the second polarization by reflecting the light from the reflective inside surface and reorienting the light having the second polarization to light of the first polarization using the quarter wave retarder.

In one embodiment, the projection display system is an LCD projector and the projection display system further includes a relay lens assembly, an LCD panel and a projection lens assembly whereby the polarized light output is modulated into light representative of an image to be displayed.

The present invention is better understood upon consideration of the detailed description below and the accompanying drawings.

BRIEF DESCRIPTION OF THE DRAWINGS

In the present disclosure, like objects which appear in more than one figure are provided with like reference numerals.

DETAILED DESCRIPTION OF THE PREFERRED EMBODIMENTS

In accordance with the principles of the present invention, a liquid crystal-based data projector includes a polarization recapture system for enhancing the efficiency and uniformity of the illumination source. In one embodiment, the data projector implements polarization recapture using a tunnel integrator and a transmitting/reflecting polarizer. Unlike traditional dye polarizers, a transmitting/reflecting polarizer reflects unwanted polarization rather than absorbs it. In one embodiment, the transmitting/reflecting polarizer is a wire grid polarizer. The tunnel integrator has a reflective inside surface at the input end coated with a quarter wave retarder for recycling the reflected, unwanted polarization to increase the usable polarized light output. In this manner, the data projector achieves high efficiency while providing an illumination source with improved brightness and uniformity.

The polarization recapture system of the present invention can be applied in transmissive LCD projectors as well as reflective LCOS projectors. In either case, the polarization recapture system of the present invention operates to provide a high quality polarized light to enhance the brightness, the contrast and ultimately improve the overall performance of the projectors. Furthermore, the polarization recapture system has the effect of reducing the size and the complexity of the liquid crystal-based data projectors. Consequently, the manufacturing cost of the projectors can also be significantly reduced.

Figure 1:
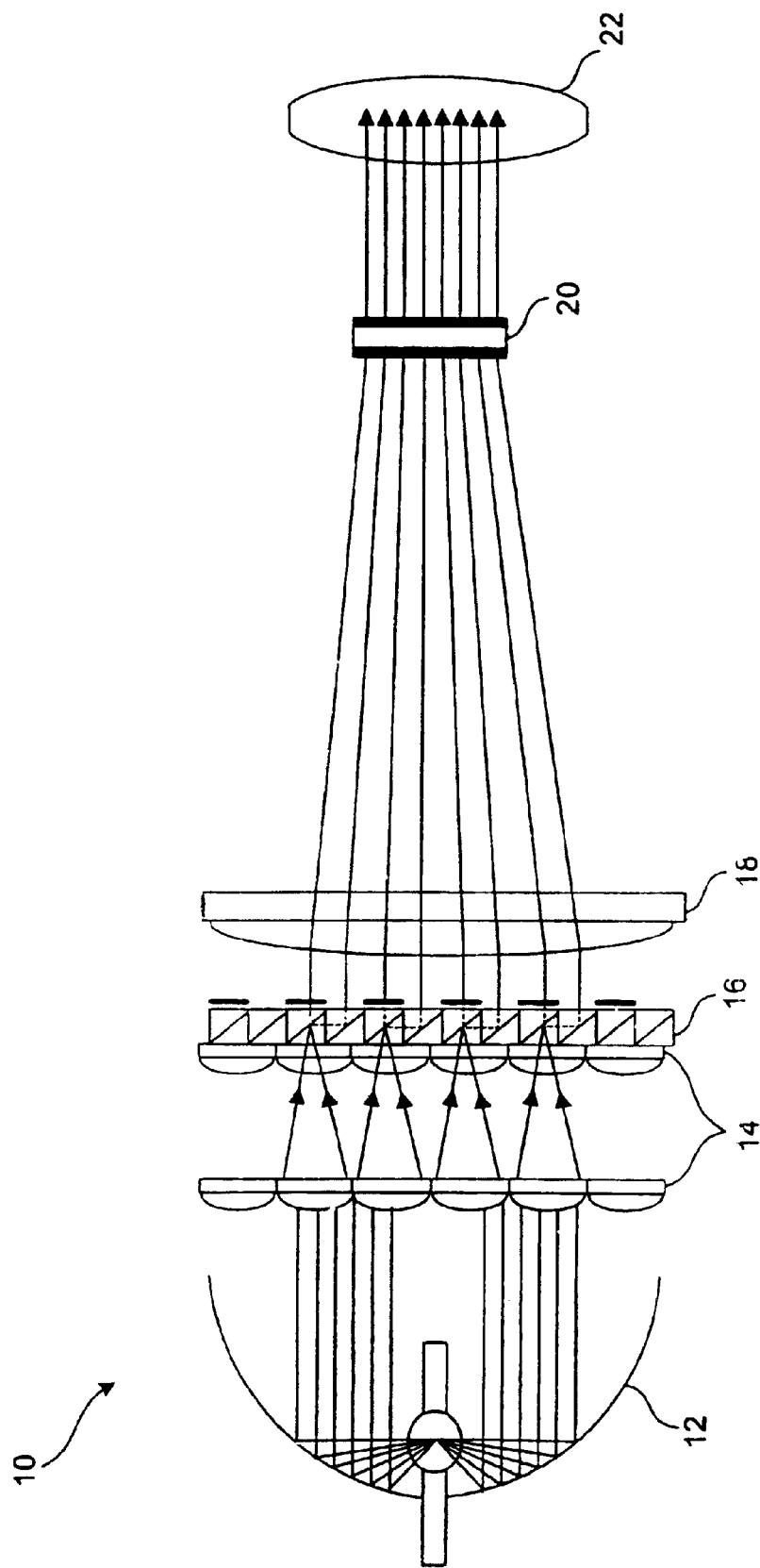
FIG. 1 is a schematic diagram of a conventional single panel LCD projector.
Figure 2:
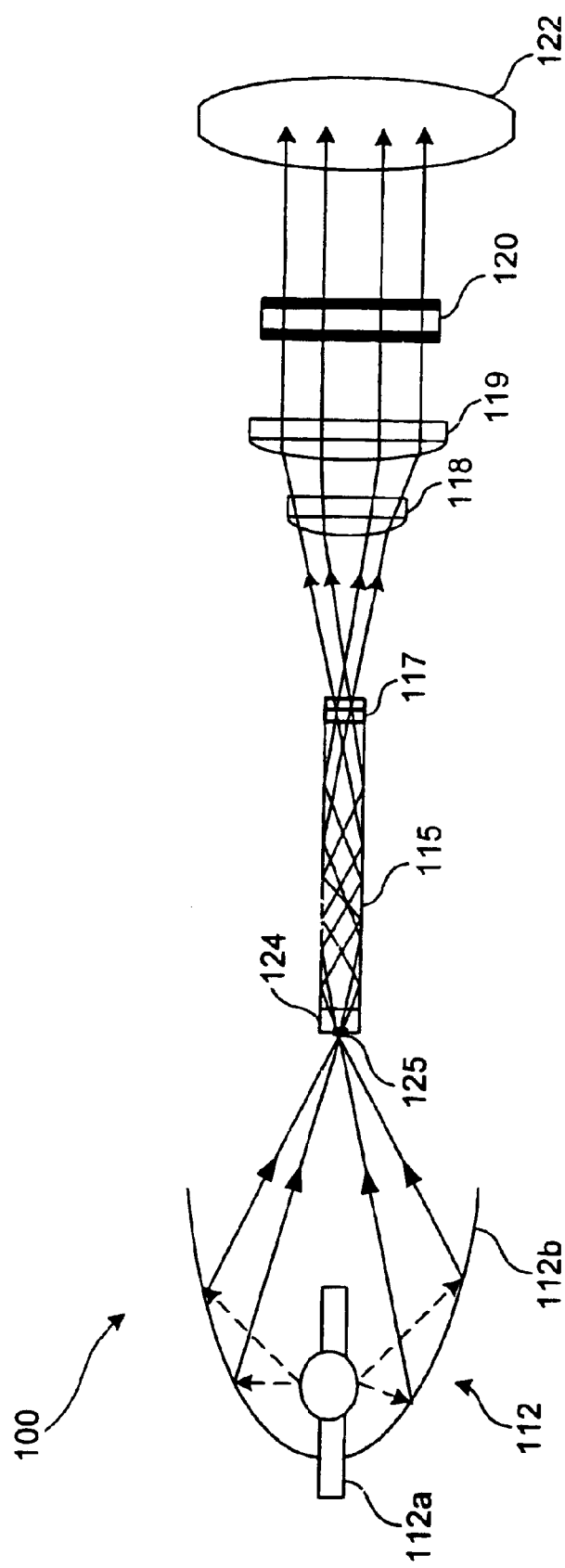
FIG. 2 is a schematic diagram of an LCD projector according to one embodiment of the present invention.

FIG. 2 is a schematic diagram of an LCD projector according to one embodiment of the present invention. LCD projector 100 includes an elliptical lamp 112 as the light source and a polarization recapture system. Lamp 112 includes a light generating element 112a emitting a randomly polarized white light and an elliptical reflector 112b for collimating and directing the light from the light generating element to a desired direction. Light generating element 112a can be a high pressure arc lamp or other devices capable of emitting the required light flux.

Polarization Recapture System

LCD projector 100 includes a polarization recapture system formed by a tunnel integrator 115 and a transmitting/reflecting polarizer 117. In the present embodiment, transmitting/reflecting polarizer 117 is a wire grid polarizer. Reflector 112b is configured to focus the randomly polarized light into tunnel integrator 115. The polarization recapture system operates to provide a polarized light output with improved uniformity and brightness.

Tunnel integrators are light integration devices used for homogenizing input light beams to improve the uniformity of the illumination source. The operation of tunnel integrators is well known in the art. In accordance with the present invention, tunnel integrator 115 is a modified tunnel integrator. Unlike conventional tunnel integrators which are open-ended, tunnel integrator 115 includes an input end 124 with an input aperture 125. Input end 124 has a reflective inside surface coated with a quarter wave retarder. Light beams from light source 112 are directed towards input aperture 125 at the input end of tunnel integrator 115 and thus enter the tunnel integrator through the aperture.

Figure 3:
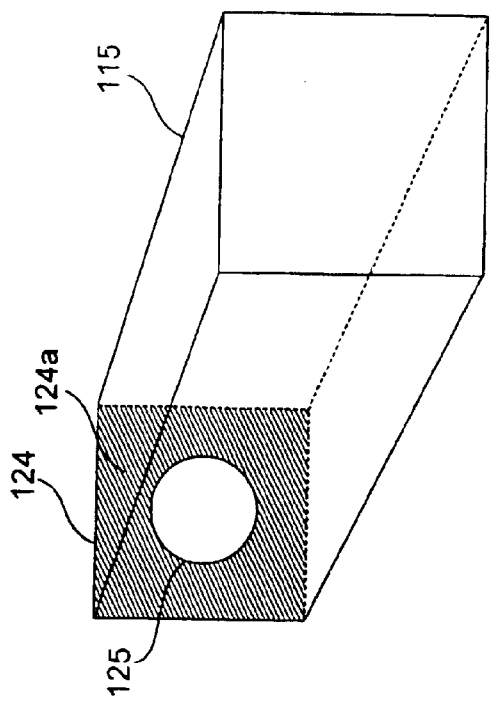
FIG. 3 is a perspective view of the tunnel integrator in the LCD projector of FIG. 2 as seen from the output end of the tunnel integrator according to one embodiment of the present invention.

FIG. 3 is a perspective view of the tunnel integrator in the LCD projector of FIG. 2 as seen from the output end of the tunnel integrator according to one embodiment of the present invention. Tunnel integrator 115 can be a rod-type uncoated solid glass light integrator operating on the principle of total internal reflection. In other embodiments, tunnel integrator 115 can also be a rod-type high-reflectance light tunnel, such as a light tunnel made of a hollow glass tube with mirrored internal surfaces. Tunnel integrator 115 is representative of any light tunnel devices or tunnel integrator devices presently known or to be developed.

In the present embodiment, input end 124 of tunnel integrator 115 includes input aperture 125 which is a circular transparent area. The inside surface of input end 124 (denoted as area 124a in FIG. 3) is a reflective surface, except at input aperture 125. In the present embodiment, the reflective inside surface is a mirrored inside surface. The mirrored inside surface can be coated with aluminum or silver to form a mirror. Other light reflective surfaces may also be used. Furthermore, mirrored inside surface 124a is coated with a quarter-wave retarder. The mirrored inside surface is configured to reflect the unwanted polarization returned from the output end of the tunnel integrator while the quarter-wave retarder is configured to rotate the orientation of the unwanted polarization so that the returned, unwanted polarization of light can become useful polarization of light. By recapturing and recycling unwanted polarization of light, tunnel integrator 115 is capable of increasing the usable light output of light source 112. The overall efficiency of LCD projector 100 can be significantly improved.

The size of input aperture 125 is selected to maximize the efficiency of the overall illumination. In the present embodiment, input aperture 125 has an area of about one-third of the cross-sectional area of input end 124 of tunnel integrator 115. Thus, mirrored inside surface 124a has an area of about two-thirds of the cross-sectional area of input end 124 and is capable of reflecting about two-thirds of the returned unwanted polarization.

The quarter wave retarder attached to the mirrored inside surface can be implemented using any conventional quarter wave plates. Typically, the quarter wave retarder is laminated to the mirrored inside surface of input end 124. A quarter-wave plate in the form of a plastic, transparent adhesive tape can be used. The plastic, transparent adhesive tape is cut to the desired size and orientation and adhered to the mirrored inside surface of the tunnel integrator. Such quarter-wave plates are available from Polytechno, Sanritz and Sumitumo, all of Japan. In the United States, Sanritz Corporation is represented by Dana Enterprises International, Inc. of Fremont, Calif. Quarter-wave plates made of inorganic materials, such as quartz, can also be used. In the present embodiment, the quarter wave retarder is configured to phase shift light beams by 90 degrees. When unwanted polarization is reflected from the output end of tunnel integrator 115, the reflected light is transmitted through the quarter wave retarder twice, once upon entering the retarder towards the mirrored surface and once upon reflecting from the mirrored surface. The quarter wave retarder will produce a total retardation of 180°. This retardation effectively rotates linearly polarized light by 90°. As will be explained in more detail below, the net rotation causes the reflected light to become oriented in a direction that allows it to be transmitted out of the tunnel integrator.

Tunnel integrator 115 can be of various sizes and its dimension is chosen to provide the required amount of light for projector 100. In FIG. 3, tunnel integrator 115, has a square cross-sectional area. The dimension and shape of tunnel integrator 115 in FIG. 3 are illustrative only. Tunnel integrator 115 can have a rectangular cross-sectional area to provide an output light beam matching the shape of the LCD panel. For example, a cross-sectional dimension ratio of 4:3 or 16:9 (width:height) can be used. Tunnel integrators, such as tunnel integrator 115, for use in the polarization recapture system of the present invention are available from Unaxis Optics USA Inc., 16080 Table Mountain Parkway, Golden, Colo. 80403. In the preferred embodiment, tunnel integrator 115 has a dimension of about 5 mm in height, 5 mm in width and 25–30 mm in length. In the present embodiment, the length to either the height or the width of the tunnel integrator has a ratio of about 5:1.

Transmitting/Reflecting Polarizer

Returning to FIG. 2, the polarization recapture system in LCD projector 100 further includes transmitting/reflecting polarizer 117 coupled to the output end of tunnel integrator 115. Transmitting/reflecting polarizers reflect, rather than absorb unwanted polarization, and thus provide an opportunity to use the reflected light as opposed to a traditional polarizer where half the light is wasted because the non-transmitting polarization is absorbed. In the present embodiment, transmitting/reflecting polarizer 117 is a wire grid polarizer. Wire grid polarizer 117 operates to provide a high quality polarized light output which can be used in any liquid-crystal based data projection system requiring polarized light for proper operation.

Wire grid polarizers for the visible light spectrum is described in U.S. Pat. No. 6,122,103 to Perkins et al., issued Sep. 19, 2000, which patent is incorporated herein by reference in its entirety. The '103 patent describes a broadband wire grid polarizer constructed as an array of parallel metal lines (usually aluminum) on a transparent glass substrate (usually borosilicate). The metal lines are separated from the glass substrate by a region of low refractive index material of a given thickness.

Wire grid polarizers have several advantages over conventional dye polarizers which make them suitable for use in data projection systems. First, wire grid polarizers operate by reflecting unwanted polarization, rather than absorbing it. Therefore, wire grid polarizers do not suffer from the problem of thermal melt down present in conventional absorptive polarizers. Second, wire grid polarizers are built on glass substrates, instead of plastic materials used for the conventional polarizers. For these reasons, wire grid polarizers are more durable under high light flux operation than conventional polarizers.

Another advantage of wire grid polarizers is their wide acceptance angle. In most cases, wire grid polarizers can accept light beams arriving at angles of +/−45 degrees. The wide acceptance angle of wire grid polarizers increases the light transmission capability of the polarizers. Lastly, wire grid polarizers are capable of providing a very high degree of polarization, such as up to 99% polarization in the output light. Therefore, wire grid polarizers can be applied to improve the contrast and the resolution of the displayed images in liquid-crystal based projection systems.

Figure 4:
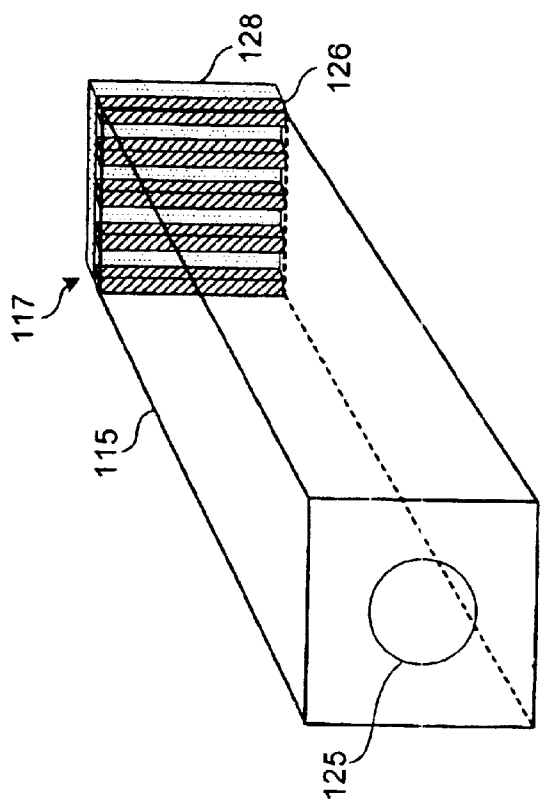
FIG. 4 is a perspective view of the tunnel integrator and the wire grid polarizer in the LCD projector of FIG. 2 as seen from the input end of the tunnel integrator according to one embodiment of the present invention.

FIG. 4 is a perspective view of the tunnel integrator and the wire grid polarizer in the LCD projector of FIG. 2 as seen from the input end of the tunnel integrator according to one embodiment of the present invention. Referring to FIG. 4, wire grid polarizer 117 is coupled to the output end of tunnel integrator 115. Wire grid polarizer 117 is in a sheet format and can be adhered to the tunnel integrator 115 using any conventional means. In one embodiment, wire grid polarizer 117 is adhered to tunnel integrator 115 by adhesive tapes. Wire grid polarizer 117 includes very thin parallel metal lines 126 supported by a transparent glass substrate 128. Wire grid polarizer 117 may further include a region of low refractive index material (not shown) between metal lines 126 and substrate 128.

The representation of wire grid polarizer 117 in FIG. 4 is illustrative only and components in FIG. 4 are not drawn to scale. One of ordinary skill in the art would appreciate that metal lines 126 of wire grid polarizer 117 are actually microscopic in size in actual implementation. However, the size of the metal lines is exaggerated in FIG. 4 (and subsequent figures) for the purpose of illustration only. In actual implementation, wire grid polarizer 117 can have a dimension equal to the cross-sectional area of tunnel integrator 115. For example, when tunnel integrator 115 is 5 mm by 5 mm in the present embodiment, wire grid polarizer 117 also has an area of 5 mm by 5 mm. Of course, wire grid polarizer 117 can have any dimensions necessary to provide adequate optical coupling to tunnel integrator 115.

The length of metal lines 126 on substrate 128 is at least greater than the wavelength of light to be polarized. Thus, the length of metal lines 126 is at least 0.7 $\mu$m. Of course, in most implementations, the length of metal lines 126 will be much greater than the wavelength of light of interest. For example, metal lines 126 usually run the entire length of wire grid polarizer 117. Thus, in the present embodiment, the metal lines can have a length of up to 5 mm, equaling the dimension of wire grid polarizer 117.

In the present embodiment, metal lines 126 are uniformly spaced. Metal lines 126 are separated by a pitch that is less than the wavelength of the light to be polarized. In the present description, the pitch is the distance between the leading edge of two adjacent metal lines in metal lines 126. For optimal results, the pitch of metal lines 126 is typically chosen to be about or less than one-half the shortest wavelength of light to be polarized. In the present embodiment, the pitch is approximately 0.2 $\mu$m or less, assuming the shortest wavelength of light to be polarized is the violet light at 0.4 $\mu$m. The width of each of metal lines 126 can range from 10% to 90% of the pitch. The thickness of metal lines 126 can range from 0.04 $\mu$m to 0.3 82 m.

Figure 5:
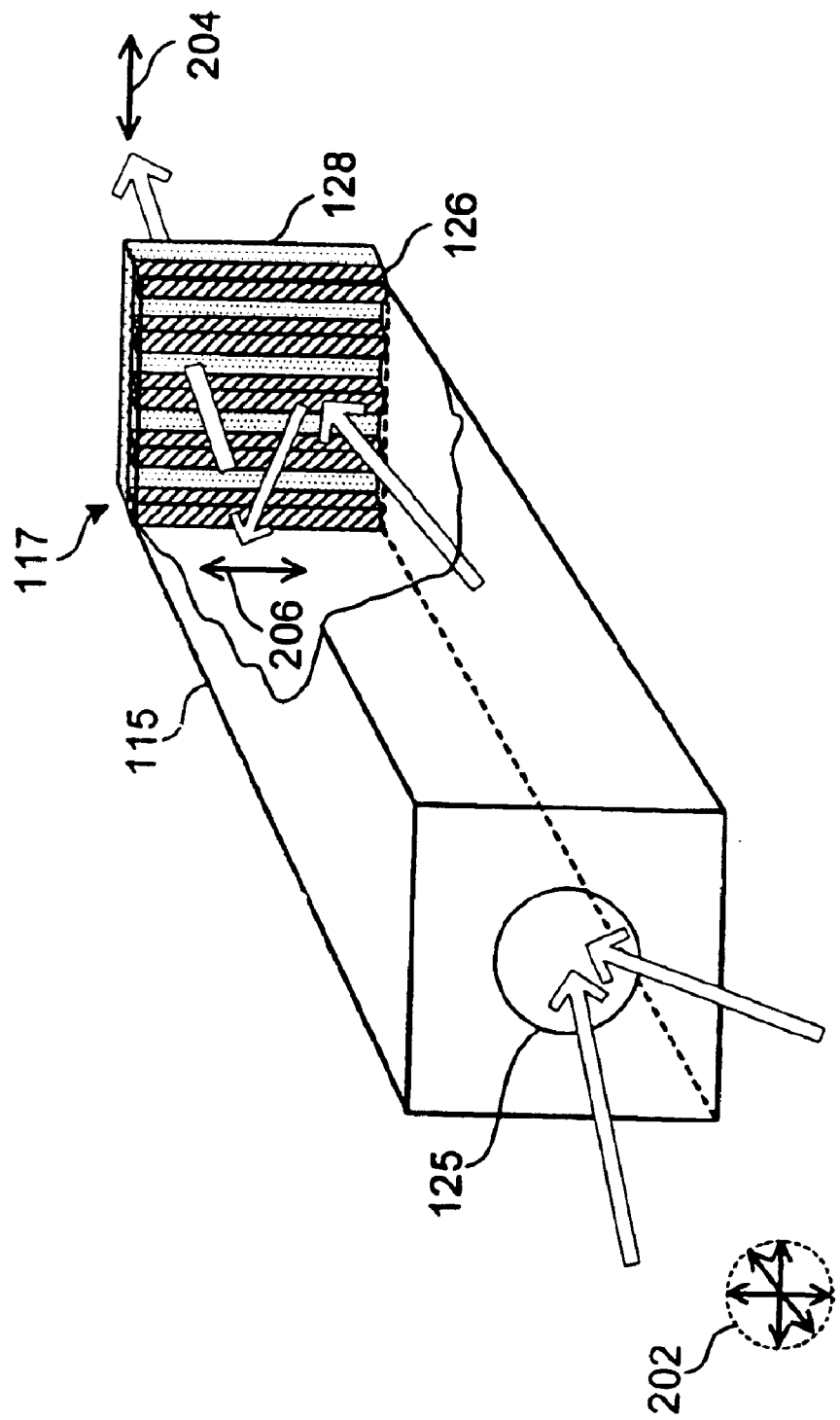
FIG. 5 is a cut-away perspective view of the tunnel integrator and wire grid polarizer of FIG. 4 according to one embodiment of the present invention.

FIG. 5 is a cut-away perspective view of the tunnel integrator and the wire grid polarizer of FIG. 4 according to one embodiment of the present invention and illustrates the operation of the wire grid polarizer for polarizing incident light beams. Wire grid polarizer 117 transmits polarized light that is normal to an axis of metal lines 126 and reflects polarized light that is parallel to the axis of metal lines 126. When wire grid polarizer 117 is configured as shown in FIG. 5, horizontally polarized light, denoted by element 204, is transmitted while vertically polarized light, denoted by element 206, is reflected. As will be explained in more detail below, the vertically polarized light is reflected back into tunnel integrator 115 and travels down the integrator until it reaches and reflects off the mirror behind surface 124a. In so doing it passes through the quarter wave plate twice and has its polarization vector rotated by 90°. In this manner, the rotated light attains a useful polarization such that when the rotated light travels back down tunnel integrator 115 to wire grid polarizer 117, the rotated light can be transmitted through the wire grid polarizer.

In the present embodiment shown in FIG. 4, wire grid polarizer 117 is mounted vertically with the metal lines perpendicular to the top and bottom surfaces of tunnel integrator 115. In other embodiments, wire grid polarizer 117 can be mounted horizontally so that the wire grid polarizer transmits vertically polarized light and reflects horizontally polarized light. Other configurations are also possible depending on the polarization needed for the projection system. The configuration in FIG. 4 is illustrative only. In general, a wire grid polarizer transmits light having a first polarization and reflects light having a second polarization that is orthogonal to the first polarization.

In the present embodiment of the present invention, wire grid polarizer 117 is a ProFlux™ wire grid polarizer manufactured by Moxtek, Inc., located at 452 West 1260 North, Orem, Utah, U.S.A. Besides wire grid polarizers, other types of transmitting/reflecting polarizers can also be used in the polarization recapture system of the present invention. For example, a thin film reflective polarizer, named Dual Brightness Enhancement Film (DBEF), is available from 3M of St. Paul, Minn. Alternately, a liquid crystal based reflective polarizer can also be used. Liquid crystal based reflective polarizer can be obtained from ColorLink, Inc., 2425 55th Street, Suite 250, Boulder, Colo. 80301.

Relay Lens and LCD Panel

Returning to FIG. 2, the polarized light output from wire grid polarizer 117 is directed to an LCD panel 120 through a relay lens assembly. In the present embodiment, the relay lens assembly includes a first positive relay lens 118 and a second positive relay lens 119. Of course, other combinations of lenses can be used to achieve the result of collecting the flux of polarized light output and collimating the light traveling towards LCD panel 120. In FIG. 2, relay lens 118 is a small but strong converging lens. That is, relay lens 118 has high optical power for collecting light exiting from tunnel integrator 115 together and directing that light to relay lens 119. Relay lens 119 is a large but weaker converging lens. That is, relay lens 119 has a smaller optical power for bringing the light from lens 118 together so that the polarized light is as parallel as possible.

Note that FIG. 2 is illustrative only and the sizes and separation of the elements in the LCD projector are not drawn to scale. For instance, in actual implementation, relay lenses 118 and 119 are typically situated very close to wire grid polarizer 117. The relay lenses are shown to be set apart from the wire grid polarizer in FIG. 2 merely for ease of illustration.

LCD panel 120 can be one of many types of transmissive LCD panels currently available or yet to be developed. In the present embodiment, LCD panel 120 is a polysilicon panel including liquid crystal and electrodes sandwiched between transparent glass plates. LCD panel 120 also includes an input polarizer and an output polarizer. LCD panel 120 includes control electronics (not shown) for controlling the liquid crystal panel which in turn modulate the incoming polarized light beam to form the designed displayed image. The modulated light from LCD panel 120 is coupled to a projection lens assembly, illustrated as projection lens 122 in FIG. 2. The projection lens assembly operates to magnify and focus the image formed by the modulated light onto a screen for display. Although the projection lens assembly is illustrated as having only one lens (lens 122) in FIG. 2, this is illustrative only and in actual implementation, the projection lens assembly typically includes a series of lenses for magnifying and focusing the modulated light. Projection lens assemblies are well known in the art and many conventional projection lens assemblies can be used in LCD projector 100 of the present invention.

LCD panel 120 includes an input polarizer for eliminating improperly polarized light beams and to correct for any rotation in the polarized light beams as a result of transmission through the relay lenses 118 and 119. In another embodiment of the present invention, LCD panel 120 can be made without an input polarizer. This is because wire grid polarizer 117 is capable of producing light with a very high degree of polarization. Therefore, an input polarizer to the LCD panel may not be necessary in some circumstances. Although a slight degradation in image quality or contrast may result with the omission of an input polarizer to the LCD panel, the degradation may be tolerated in exchange for an appreciable reduction in manufacturing cost and a significant:increase in brightness in the projected image.

Operation of Polarization Recapture System

The operation of the polarization recapture system of the present invention in LCD projector 100 will now be described in detail with reference to FIGS. 2 to 5.

First, randomly polarized white light (light element 202 in FIG. 5) from light source 112 is focused into input aperture 125 of tunnel integrator 115. The randomly polarized light is generally not parallel to the sides of the tunnel integrator and is reflected off the inside surfaces of the tunnel integrator. All of the light eventually reaches the output end of the tunnel integrator. The action of some of the light reflecting once or twice off the inside mirrors and mixing with light traveling directly to the output end effectively homogenizes the light. The homogenization produces a light output at the output end of the tunnel with a high degree of brightness and uniformity.

At the output end of tunnel integrator 115, wire grid polarizer 117 transmits only polarized light having a horizontal orientation and reflects polarized light having a vertical orientation.

The reflected vertically polarized light, which is the unwanted polarization, travels back down the tunnel integrator 115 towards the input end of the tunnel integrator. The vertically polarized light is recycled in tunnel integrator 115 by the action of mirrored inside surface 124a and the quarter wave retarder. In fact, the vertically polarized light is reoriented and reflected from the inside surface so as to increase the usable light output from the light source. Specifically, the vertically polarized light is phased shifted once upon entering the quarter-wave retarder, is reflected from the mirrored inside surface, and is then phased shifted again upon exiting the quarter-wave retarder. Thus, the initially vertically polarized light is rotated by 90° and becomes horizontally polarized. The percentage of unwanted polarization that can be reflected from mirrored inside surface 124a is dependent upon the size of input aperture 125. If input aperture 125 is made very small, most of the reflected unused polarized light could be recaptured and reused.

The recycled horizontally polarized light is homogenized by tunnel integrator 115 as the light travels down the tunnel integrator to the output end. The recycled horizontally polarized light can now be transmitted out of wire grid polarizer 117 because it now has the proper orientation.

By recycling and reusing unwanted polarization of light that would otherwise be wasted, the polarization recapture system of the present invention can improve the efficiency of the light source significantly. For instance, when the input aperture has an area of about one-third the cross-sectional area of tunnel integrator 115, so that mirrored inside surface 124a occupies the remaining two-thirds of the cross-sectional area of the tunnel integrator, a gain of 67% can be achieved. When the polarization recapture system of the present invention is incorporated in an LCD projector, the LCD projector can be implemented with a lower power light source while providing a brightness level in the output image commensurate with that of a conventional LCD projector using a higher power light source. Therefore, an LCD projector incorporating the polarization recapture system of the present invention can be made more compact and more power efficient, thus more suitable for portable applications.

Color Applications

Referring to FIG. 2, LCD projector 100 is a single panel LCD projector. For color applications, LCD projector 100 can be operated as a single panel full-color projector. Methods for using a single panel LCD projector for full color display are well known and LCD projector 100 can be modified accordingly to provide color display capability.

In one embodiment, LCD projector 100 includes a color wheel disposed in the optical path of the projector. For example, the color wheel can be placed at the output of wire grid polarizer 117 and before relay lens 118. In other implementations, the color wheel can also be placed between relay lens 119 and LCD panel 120. The color wheel is created using color dichroic coatings (such as RGB dichroic coating) arranged either in a spiral pattern or in a "spiral of Archimedes" pattern as described in the aforementioned article by DeWald et al. The color wheel spins at a very high rate of speed to generate polarized light of different color components, such as the three primary color components of red, green and blue. LCD panel 120 is a sufficiently fast image modulator for forming modulated images in the three primary colors. When the images in three primary colors are sequentially flashed onto a screen at a fast enough speed, the images will be perceived by the human eyes as one composite color image.

Figure 6A:
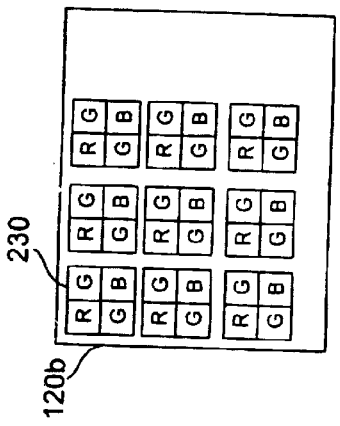
FIGS. 6a and 6b illustrate two different types of color LCD panels.
Figure 6B:
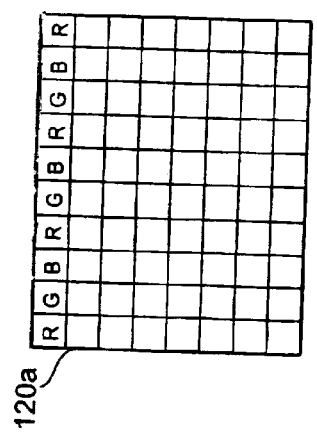

In another embodiment, a color LCD panel can be used. A color LCD panel is an LCD panel incorporated with color filters so that a selected group of pixels on the panel is disposed to display modulated light of a particular color component. FIGS. 6a and 6b illustrate two different types of color LCD panels. In FIG. 6a, a color LCD panel 120a includes color stripes in the three primary colors (RGB). The color stripes repeat throughout the LCD panel. A full color image is formed by modulating the pixels associated with each color component accordingly. In FIG. 6b, a color LCD panel 120b includes a filter pattern superimposed on the LCD panel where four neighboring pixels form one color pixel. Specifically, a color pixel 230 in color LCD panel 120b includes a red pixel, two green pixels and a blue pixel formed as a square as shown in FIG. 6b. The filter pattern repeats throughout the LCD panel.

In yet another embodiment, a color scrolling technique can be used in a single-panel LCD panel for displaying a full color image. Methodologies for implementing the color scrolling technique are described in U.S. Pat. Nos. 5,410,370, 5,532,763, 5,548,347, 5,845,981 and 6,191,893, which patents are incorporated herein by reference in their entireties. In brief, color scrolling operates by separating white light using dichroic filters into light bands of the primary colors (e.g. RGB). A rotating prism is used to sequentially-:scan the RGB light bands across an LCD panel so that a continuous sweep of the three primary colors is presented to the LCD panel. The sequential scrolling of the RGB color bands across the LCD panel allows a full color image to be formed.

Figure 7:
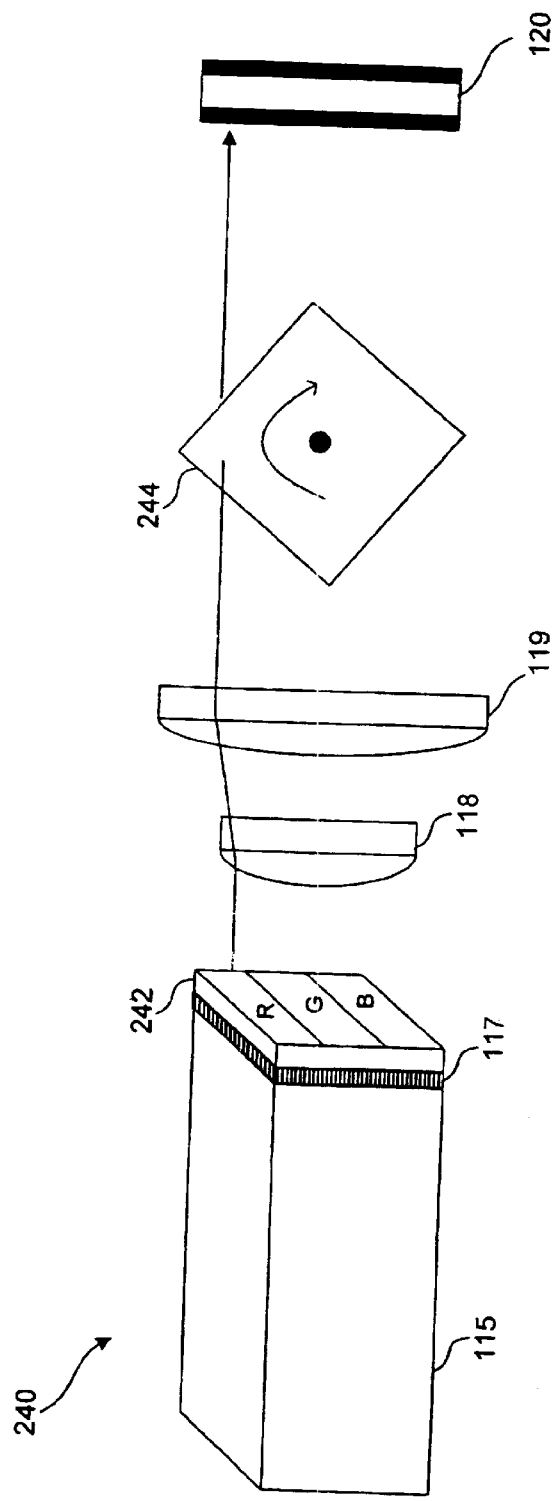
FIG. 7 illustrates a single-panel LCD projector using a color scrolling and a color recapture technique for displaying a full color image according to one embodiment of the present invention.

FIG. 7 illustrates a single-panel LCD projector using a color scrolling technique for displaying fullcolor image according to one embodiment of the present invention. LCD projector 240 incorporates a polarization recapture system as in LCD projector 100. That is, LCD projector 240 includes tunnel integrator 115 with a reflective input end (not shown) and transmitting/reflecting polarizer 117. To implement color scrolling, an RGB dichroic filter assembly 242 is coupled to the output end of transmitting/reflecting polarizer 117. In the present embodiment, RGB dichroic filter assembly 242 includes three color dichroic filters, each filter disposed to transmit light of one primary color component (red, green or blue). After the color-filtered polarized light is transmitted through a relay lens system (including relay lenses 118 and 119), the color-filtered polarized light is transmitted through a rotating four-sided prism 244. Four-sided prism 244 operates to scroll light bands in the three primary color across LCD panel 120. As a result of sequentially scrolling the primary color bands across LCD panel 120, a full color image can be formed.

In accordance with the present invention, the polarization recapture system of LCD projector 240 of FIG. 7 also functions as a color recapture system. Color recapturing is described in the aforementioned paper by DeWald et al. and operates by recycling light of unused colors so that the recycled light may exit the tunnel integrator in a color which can be used by the subsequent image forming device. However, the color recapture system of the present invention achieves advantages not realizable by the conventional color recapture system. First, in the present embodiment, the color recapture filters (RGB dichroic filter assembly 242) are affixed to the output end of tunnel integrator 115 adjacent transmitting/reflecting polarizer 117. The color recapture system of DeWald et al. uses a color wheel so that the color filters are continuously moving in front of the light integrating device. The configuration of the color recapture system in FIG. 7 results in a rectangular shape of RGB sections being imaged onto LCD panel 120, as opposed to a spiral shape of RGB sections in the conventional system. The spiral shaped RGB sections are not desirable because the color recapture system tends to be inefficient and requires a special image processor to maintain optical efficiency.

In FIG. 7 and in the above description, the color recapture system of the present invention is described in conjunction with the polarization recapture system of the present invention for use in an LCD projector for providing color illumination. The color recapture system of the present invention can also be used in other types of projection systems for providing color illumination. When the projection system does not require polarized light, the configuration in FIG. 7 can be modified by eliminating the transmitting/reflecting polarizer and attaching RGB dichroic filter assembly 242 directly to the output end of tunnel integrator 115. In this manner, tunnel integrator 115 and RGB dichroic filter assembly 242 operates to provide color illumination to the subsequent stages of the projection system and operates to recapture unused color light to improve the efficiency of the projection system.

The polarization recapture system of the present invention can also be applied in a three-panel full-color projector. In the case of a three-panel full-color projector, LCD panel 120 is one of three LCD panels in LCD projector 100. LCD projector 100 will further include color dichroic mirrors or other color separation devices for separating the polarized light output from transmitting/reflecting polarizer 117 into the separate primary color components. The separate light fluxes of each color component are directed to their respective LCD panels to form their respective color images. The separate color images are recombined to form one full-color image using a color recombining prism. In another embodiment, the dichroic mirrors for color separation can be placed in the optical path after light source 112, in which case the polarization recapture system of the present invention is duplicated and placed in the optical path of each of the color components. Of course, numerous configurations can be used to modify LCD projector 100 of FIG. 2 into a three-panel LCD projector, as can be appreciated by one of ordinary skill in the art.

A three-panel LCD projector will inevitably be larger in size than a single panel LCD projector. Therefore, when size and portability is of concern, the single-panel LCD projector is preferred over the three-panel projector.

Advantages

The incorporation of the polarization recapture system of the present invention in an LCD projector provides advantages not realized in conventional LCD projectors. An. LCD projector incorporating the polarization recapture system of the present invention can achieve significant performance and efficiency improvement over conventional LCD projectors.

First, the use of a tunnel integrator to homogenize the light source can significantly improve the uniformity of the output light. Specifically, both the color uniformity and brightness uniformity of the projection system can be improved. The use of a tunnel integrator eliminates the systematic color gradient problem often observed in conventional projector systems. The high degree of color and brightness uniformity in the LCD projector of the present invention cannot be readily achieved in conventional projector systems, such as lens array/PCS projection systems. Furthermore, the conventional projector systems often employ "cleanup" filters for removing color gradient artifacts in the displayed image. Such filtering results in a loss of light, making the conventional projector systems less bright and less efficient.

Second, the polarization recapture system of the present invention improves the efficiency of the light source by recycling and converting unwanted polarization into the desired polarization state. Thus, an LCD projector of the present invention can achieve a higher level of brightness and contrast in the displayed image. The brightness and contrast level achievable by an LCD projector incorporating the polarization recapture system of the present invention cannot be readily attained in conventional projection systems using similar light sources.

Third, tunnel integrators are more efficient than lens array integrators used in the conventional projectors due to fabrication limitations in the manufacture of lens array integrators. The small draft requirement between the lens elements, necessary for forming the lenslets in the molded array, is wasted space, unavailable for light collection. In a small size lens array, for example, 36×36 mm, an unusable area of 5% to 10% of the total area can result. Tunnel integrators do not suffer from such limitations.

The application of a transmitting/reflecting polarizer, such as a wire grid polarizer, to a tunnel integrator and the incorporation of an input aperture with a mirrored inside surface and a quarter wave retarder in the tunnel integrator to form a polarization recapture system in order to provide a polarized illumination source with improved efficiency and uniformity has not been appreciated prior to the present invention.

Prior to the present invention, prior art teachings have not provided feasible means to incorporate a polarizer into a tunnel integrator without a significant loss of light, which loss of light defeats the original reason for using a tunnel integrator. The inventors of the present invention recognize the advantages of using a tunnel integrator with a transmitting/reflecting polarizer to recapture and recycle unwanted polarization so as to increase the usable polarized light output. The advantages of the polarization recapture system of the present invention have not been appreciated by those skilled in the art prior to the present invention.

The above detailed descriptions are provided to illustrate specific embodiments of the present invention and are not intended to be limiting. Numerous modifications and variations within the scope of the present invention are possible. For example, while the tunnel integrators in the above descriptions are rectangular rod-type light integration devices, tunnel integrators of other shape can also be used, such as cylindrical light integration devices. Furthermore, while the above descriptions pertain to a transmissive LCD projector, one of ordinary skill in the art would appreciate that the polarization recapture system of the present invention can be applied to other data projection systems, such as reflective LCOS projectors, for providing a more uniform and highly efficient polarized illumination source. The present invention is defined by the appended claims.

We claim:

1. A projection display system, comprising:
a light source emitting a randomly polarized light;
a tunnel integrator having an input end and an output end, the input end comprising and input aperture and a reflective inside surface coated with a quarter wave retarder, the randomly polarized light from the light source arriving at the input end of the tunnel integrator, entering the tunnel integrator through the input aperture, and outputting the tunnel integrator at the output end as uniform beam of light;
a plurality of dichroic filters coupled to the output end of the tunnel integrator, each of the plurality of dichroic filter disposed to transmit light of one of at least three primary color components; and
a four-sided prism coupled in the optical path of the tunnel integrator and the plurality of dichroic filter;
wherein the four-sided prism is rotated for scrolling colored light of in each of the at least three primary color components generated by the plurality of dichroic filters.

2. The projection display system of claim 1, further comprising:
a transmitting/reflecting polarizer coupled between the output end of the tunnel integrator and the plurality of dichroic filters, the transmitting/reflecting polarizer transmitting light having a first polarization as polarized light output and reflecting light having a second polarization orthogonal to the first polarization back into the tunnel integrator; and
an LCD panel for modulating the polarized and colored light output form the four-sided prism to form modulated light output indicative of an image to be displayed;
wherein the tunnel integrator recycles the light of the second polarization by reflecting and reorienting the light of the second polarization to light of the first polarization.

3. The projection display system of claim 1, wherein the plurality of dichroic filters are arranged as rectangular bands across the output end of the tunnel integrator.

4. A projection display system, comprising:
a light source emitting randomly polarized light;
a polarization recapture system comprising:
a tunnel integrator having an input end and an output end, the input end comprising an input aperture and a reflective inside surface coated with a quarter wave retarder; and
a transmitting/reflecting polarizer coupled to the output end of the tunnel integrator;
a relay lens assembly arranged in the optical path between the polarization recapture system and an LCD panel, the relay lens assembly collimating and focusing the polarized light output onto the LCD panel, wherein the relay lens assembly comprises a first positive relay lens of a strong curvature and a second positive relay lens of a weaker curvature;
the LCD panel modulating the polarized light output to form modulated light output indicative of an image to be displayed; and a projection lens assembly arranged in the optical path of the LCD panel for projecting the modulated light output from the LCD panel, wherein the randomly polarized light from the light source arrives as the input end of the tunnel integrator and enters the tunnel integrator through the input aperture, and the polarization recapture system transmits light having a first polarization as polarized light output and recycles light having a second polarization orthogonal to the first polarization.

5. The projection display system of claim 4, wherein the light having the second polarization is reflected by the transmitting/reflecting polarizer back into the tunnel integrator, and the polarization recapture system recycles the light having the second polarization by reflecting the light from the reflective inside surface and reorienting the light having the second polarization to light of the first polarization.

6. The projection display system of claim 4, wherein the reflective inside surface is a mirrored inside surface except at the input aperture.

7. The projection display system of claim 6, wherein the mirrored inside surface is an aluminum coated mirrored inside surface.

8. The projection display system of claim 4, wherein the input aperture is a circular transport area.

9. The projection display system of claim 4, wherein the input aperture has an area approximately equal to a one-third of the cross-sectional area of the input end of the tunnel integrator.

10. The projection display system of claim 4, wherein the quarter wave retarder comprises a quarter wave plate attached to the reflective inside surface at the input end of the tunnel integrator.

11. The projection display system of claim 10, wherein the quarter wave plate comprises a plastic, transparent laminate with an adhesive coating.

12. The projection display system of claim 10, wherein the quarter wave plate comprises a quartz wave plate.

13. The projection display system of claim 4, wherein the tunnel integrator is a rod-type solid glass light integrator.

14. The projection display system of claim 4, wherein the tunnel integrator is a rod-type high-reflectance light tunnel.

15. The projection display system of claim 14, wherein the tunnel integrator has a cross-sectional area of about 5 mm by 5 mm.

16. The projection display system of claim 14, wherein a cross-sectional area of the tunnel integrator has a width-:height ratio of 4:3 or 16:9.

17. The projection display system of claim 14, wherein the tunnel integrator has a length of approximately 25 to 30 mm.

18. The projection display system of claim 14, wherein the tunnel integrator has a length to height or width ratio of 5:1.

19. The projection display system of claim 4, wherein the light source comprises a lamp emitting the randomly polarized light and an elliptical reflector directing the randomly polarized light at the input aperture of the tunnel integrator.

20. The projection display system of claim 4, wherein the light source comprises a lamp emitting the randomly polarized light, a parabolic reflector and a condenser lens directing the randomly polarized light at the input aperture of the tunnel integrator.

21. The projection display system of claim 4, wherein the transmitting/reflecting polarizer is a thin film reflective polarizer.

22. The projection display system of claim 4, wherein the transmitting/reflecting polarizer is a crystal-based reflective polarizer.

23. The projection display system of claim 4, wherein the transmitting/reflecting polarizer is a wire grid polarizer.

24. The projection display system of claim 23, wherein the wire grid polarizer is adhered to the output end of the tunnel integrator.

25. The projection display system of claim 23, wherein the wire grid polarizer comprises a transparent glass substrate and parallel metal lines formed thereon.

26. The projection display system of claim 25, wherein the wire grid polarizer transmits polarized light that is normal to the long axis of the metal lines and reflects polarized light that is parallel to the long axis of the metal lines.

27. The projection display system of claim 25, wherein the parallel metal lines are separated by a pitch that is less than one-half of the shortest wavelength of light to be polarized.

28. The projection display system of claim 4, wherein the transmitting/reflecting polarizer has an area equal to the cross-sectional area to the tunnel integrator.

29. The projection display system of claim 4, wherein the LCD panel comprises a liquid crystal module and control electrodes sandwiched between transparent glass plates, and an output polarizer.

30. The projection display system of claim 29, wherein the LCD panel further comprises a pattern of color filters superimposed and in registration with each pixel on the LCD module.

31. The projection display system of claim 30, wherein the pattern of color filters comprises color stripes in each of three primary colors.

32. The projection display system of claim 4, wherein the LCD panel further comprises an input polarizer.

33. The projection display system of claim 4, wherein the relay lens assembly is one of a plurality of relay lens assemblies and the LCD panel is one of a plurality of LCD panels, and the projection display system further comprises:
  a plurality of color dichroic mirrors disposed in the optical path between the transmitting/reflecting polarizer and a respective one of the relay lens assemblies, each of the relay lens assemblies directing one color component of the polarizer light output to a respective one of the plurality of LCD panels; and
  a color recombining prism in the optical path between the plurality of LCD panels and the project lens assembly for recombining modulated light output from each of the plurality of LCD panels to from a full color display image.

34. A projection display system, comprising:
  a light source emitting randomly polarized light;
  a polarization recapture system comprising:
    a tunnel integrator having an input end and an output end, comprising an input aperture and a reflective inside surface coated with a quarter wave retarder; and
    a transmitting/reflecting polarizer coupled to the output end of the tunnel integrator;
  a relay lens assembly arranged in the optical path between the polarization recapture system and an LCD panel, the relay lens assembly collimating and focusing the polarized light output onto the LCD panel;
  the LCD panel modulating the polarized light output to form modulated light output indicative of an image to be displayed;

a projection lens assembly arranged in the optical path of the LCD panel for projecting the modulated light output from the LCD panel; and a color wheel in the optical path between the transmitting/reflecting polarizer and the relay lens assembly, the color wheel comprising at least three color components thereon representative of three primary colors, wherein the randomly polarized light from the light source arrives as the input end of the tunnel integrator and enters the tunnel integrator through the input aperture, and the polarization recapture system transmits light having a first polarization as polarized light output and recycles light having a second polarization orthogonal to the first polarization.

35. The projection display system of claim 34, wherein the color wheel comprises color dichroic coating of the at least three color components arranged in a spiral pattern.

36. A projection display system, comprising:

a light source emitting randomly polarized light;

a polarization recapture system comprising:
  a tunnel integrator having an input end and an output end and an output end, the input end comprising an input aperture and a reflective inside surface coated with a quarter wave retarder; and
  a transmitting/reflecting polarizer coupled to the output end of the tunnel integrator;

a relay lens assembly arranged in the optical path between the polarization recapture system and an LCD panel, the relay lens assembly collimating and focusing the polarized light output onto the LCD panel;

the LCD panel modulating the polarized light output to form modulated light output indicative of an image to be displayed;

a projection lens assembly arranged in the optical path of the LCD panel for projecting the modulated light output from the LCD panel; and a color wheel in the optical path between the relay lens assembly and the LCD panel, the color wheel comprising at least three color components thereon representative of three primary colors, wherein the randomly polarized light from the light source arrives at the input end of the tunnel integrator and enters the tunnel integrator through the input aperture, and the polarization recapture system transmits light having a first polarization as polarized light output and recycles light having a second polarization orthogonal to the first polarization.

37. The projection display system of claim 36, wherein the color wheel comprises color dichroic coating of the at least three color components arranged in a spiral pattern.

38. A projection display system, comprising:

a light source emitting randomly polarized light;

a polarization recapture system comprising:
  a tunnel integrator having an input end and an output end, the input end comprising an input aperture and a reflective inside surface coated with a quarter wave retarder; and
  a transmitting/reflecting polarizer coupled to the output end of the tunnel integrator;

a relay lens assembly arranged in the optical path between the polarization recapture system and an LCD panel, the relay lens assembly collimating and focusing the polarized light output onto the LCD panel;

the LCD panel modulating the polarized light output to form modulated light output indicative of an image to be displayed;

a projection lens assembly arranged in the optical path of the LCD panel for projecting the modulated light output from the LCD panel;

a plurality of dichroic filters coupled to the transmitting/reflecting polarizer, each of the plurality of dichroic filters disposed to transmit light of one of at least three primary color components; and a four-sided prism coupled between the relay lens assembly and the LCD panel, wherein the four-sided prism is rotated for scrolling light of each of the at least three primary color components across the LCD panel, wherein the randomly polarized light from the light source arrives at the input end of the tunnel integrator and enters the tunnel integrator through the input aperture, and the polarization recapture system transmits light having a first polarization as polarized light output and recycles light having a second polarization orthogonal to the first polarization.

39. The projection display system of claim 38, wherein the plurality of dichroic filters are arranged as rectangular bands across an output end of the transmitting/reflecting polarizer.

* * * * *